(12) United States Patent
Mann

(10) Patent No.: US 8,707,433 B1
(45) Date of Patent: Apr. 22, 2014

(54) FAKE EXCEPTION HANDLER DETECTION

(75) Inventor: Uri Mann, Oak Park, CA (US)

(73) Assignee: Symantec Corporation, Mountain View, CA (US)

(*) Notice: Subject to any disclaimer, the term of this patent is extended or adjusted under 35 U.S.C. 154(b) by 199 days.

(21) Appl. No.: 13/100,001

(22) Filed: May 3, 2011

(51) Int. Cl.
*G06F 11/00* (2006.01)

(52) U.S. Cl.
USPC .............................................. 726/23; 726/22

(58) Field of Classification Search
USPC ................................ 726/22–26; 713/187, 188
See application file for complete search history.

(56) References Cited

U.S. PATENT DOCUMENTS

2010/0257608 A1* 10/2010 Jeong et al. ...................... 726/24
2012/0167120 A1* 6/2012 Hentunen ......................... 719/320

* cited by examiner

*Primary Examiner* — Farid Homayounmehr
*Assistant Examiner* — Suman Debnath
(74) *Attorney, Agent, or Firm* — Brill Law Office; Jeffrey Brill

(57) ABSTRACT

Fake exception handlers resulting from malicious stack buffer overflows that overwrite an exception handling record on the stack are detected. The operating system exception processing logic is monitored. Responsive to an exception occurring, an exception handler to be called by the monitored operating system exception processing logic is identified. A specific number of the first bytes of the identified exception handler are scanned to determine whether a return instruction is present therein. Instructions of the identified exception handler that are positioned prior to the return instruction are analyzed to determine whether they modify the value of the stack pointer so as to shrink the stack. The identified exception handler is adjudicated as being fake, responsive to determining that a return instruction is present in the first specific number of bytes of the exception handler and/or that the instructions positioned prior to the return instruction shrink the stack.

15 Claims, 4 Drawing Sheets

FAKE EXCEPTION HANDLER DETECTION

TECHNICAL FIELD

This disclosure pertains generally to computer security, and more specifically to detecting fake exception handlers resulting from malicious stack buffer overflows that overwrite an exception handling record.

BACKGROUND

One procedure used by malicious parties to introduce malware into computer systems involves intentionally causing a stack buffer overflow. By taking advantage of an error in an existing software program, an attacker can overflow the stack buffer in such a way as to cause malicious code to be executed. By causing specific values to be written to specific locations in the overflowed stack buffer, the attacker takes over the flow of execution, and thereby runs malware on the system.

One known exploit of this type involves an attacker overwriting the Structured Exception Handling (SEH) record on the stack, so as to cause the attacker's malicious code to execute when an exception is thrown. More specifically, the Structured Exception Handling mechanism utilizes a linked list of exception structures. Each record in the linked list includes a pointer to an exception handler (for handling a specific exception type) and a pointer to the next record in the list (Next pointer). The first exception record is stored at a known location on the stack. When an exception occurs, the exception handler pointed to by the first record is called. If the exception handler can process the exception that occurred, it does so and then returns. Otherwise, it calls the next exception handler in the list.

The attacker leverages the stack buffer overflow to overwrite the pointer in the first exception record with the address of a fake exception handler. When an exception occurs, the fake exception handler is called instead of the legitimate exception handler. The fake exception handler manipulates the flow of execution so as to transfer control to the attacker's malicious shellcode. More specifically, the attacker further uses the stack buffer overflow to overwrite a specific location in the stack with the beginning of the attacker's shellcode. The fake exception handler then modifies the value of the stack pointer so as to continue execution from that location when the fake exception handler returns.

Because attacks which are based on overwriting the SEH record are common, several conventional techniques are employed to attempt to detect and prevent such attacks. In one such technique, the operating system checks that the last entry in the exception registration record chain has its Next pointer set to a special termination value (0xFFFFFFFF). Unfortunately, attackers can easily circumvent this approach by creating a fake chain of exception registration records, in which the Next pointer of the last record is set to the proper terminating value. Because the first exception record is always located at the same position on the stack, it is easy for an attacker to create a chain of fake exception records.

A similar technique is called Structured Exception Handling Overwrite Protection (SEHOP). In this approach, the operating system checks that the last entry in the chain is a specific exception handler (ntdll!FinalExceptHandler). An attacker can circumvent this technique by creating a chain of fake exception records as described above, in which the Next pointer of the next to last record points to the expected last entry.

Another approach involves placing specific random values ("cookies") in the vicinity of vulnerable areas of the stack frame. By comparing current cookie values with control values, the operating system attempts to mitigate against stack buffer overflow exploits. This method is implemented in the Microsoft family of compilers by compiling source code with the GS flag. Attackers can circumvent this approach by avoiding cookie overwrite, or by guessing and maintaining the cookie values. Additionally, not all source code is compiled with the GS flag, and thus not all programs are protected in this manner. Even for software compiled with the GS flag, not all frames contain the cookies as a result of compiler optimization of the executable image.

Microsoft has developed a technology known as SafeSEH, which ensures that only specific routines in a protected module (DLL or EXE) are used for handling exceptions. This technique is employed by 64-bit exception handling code, and can be optionally used by 32-bit binaries. However, 32-bit code must be explicitly recompiled with a compiler supporting the SafeSEH technology. Commonly, an attacker avoids SafeSEH detection by using code from legacy modules which were compiled with an older compiler.

Another SEH validation method involves checking the memory attributes of the exception handler's address. If the handler is not in an executable section of memory (PAGE_EXECUTE_XXX), it is flagged as an exploit. This protects against some attacks, but does not catch fake exception handlers, because fake exception handlers are always located in an executable section of memory.

It would be desirable to address these issues.

SUMMARY

A fake exception handler detection system detects fake exception handlers resulting from malicious stack buffer overflows that overwrite an exception handling record on the stack. The operating system exception processing logic is monitored, for example by intercepting or modifying operating system exception processing routines. Responsive to an exception occurring, an exception handler to be called by the monitored operating system exception processing logic is identified. A specific number of the first bytes of the identified exception handler are scanned (e.g., the first 8 bytes under a 32 bit processor), thereby determining whether a return instruction is present in the first specific number of bytes of the identified exception handler. If a return instruction is present, instructions of the identified exception handler that are positioned prior to the return instruction are analyzed, thereby determining whether the analyzed instructions that are positioned prior to the return instruction modify the value of the stack pointer so as to shrink the stack by the size of two pointers (e.g., 8 bytes on 32-bit processors or 16 bytes on 64-bit processors). The identified exception handler is adjudicated as being fake, responsive to heuristics such as determining that a return instruction is present in the first specific number of bytes of the identified exception handler and/or that the analyzed instructions that are positioned prior to the return instruction modify the value of the stack pointer so as to shrink the stack.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
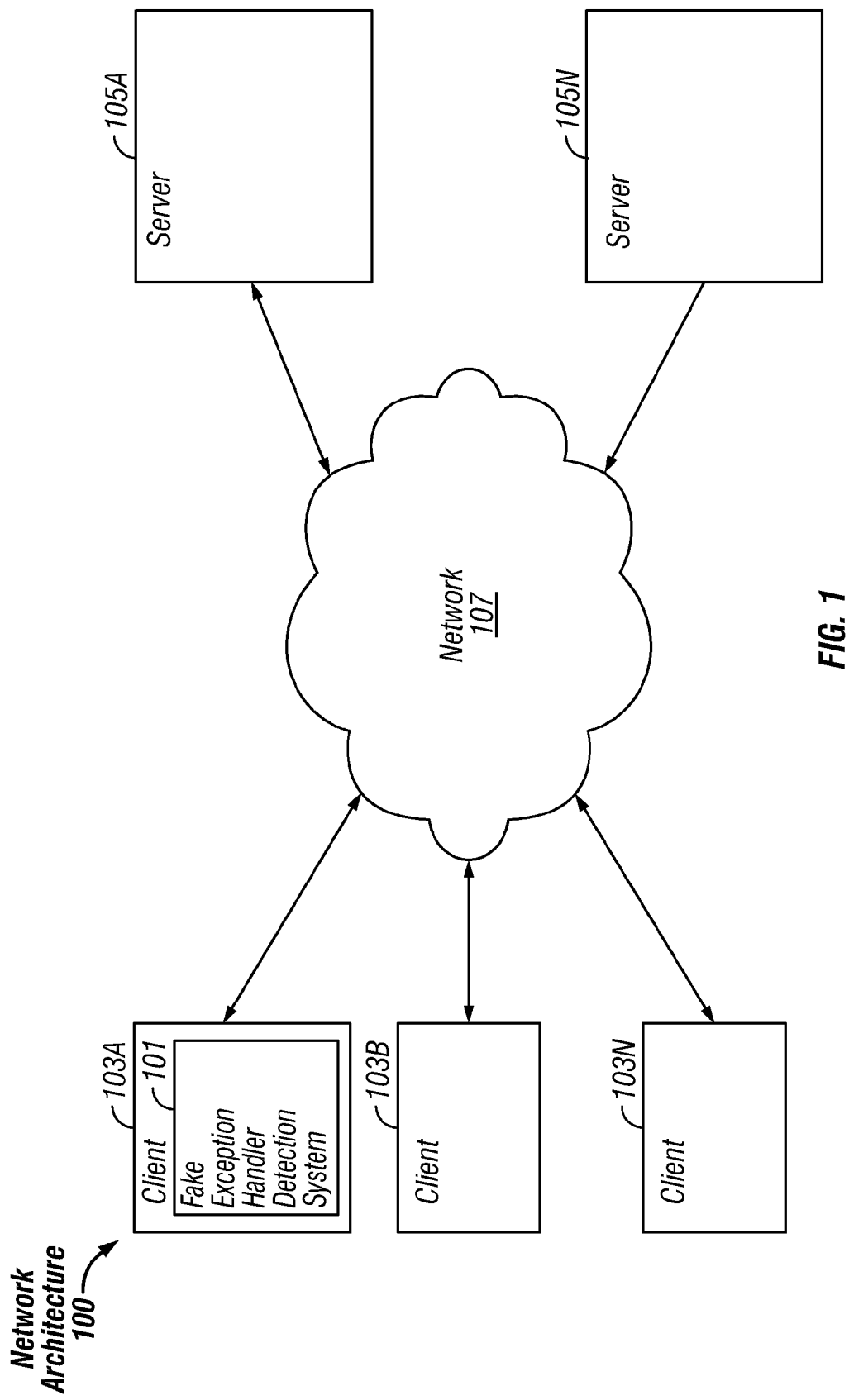
FIG. 1 is a block diagram of an exemplary network architecture in which a fake exception handler detection system can be implemented, according to some embodiments.

FIG. 1 is a block diagram illustrating an exemplary network architecture 100 in which a fake exception handler detection system 101 can be implemented. The illustrated network architecture 100 comprises multiple clients 103A, 103B and 103N, as well as multiple servers 105A and 105N. In FIG. 1, the fake exception handler detection system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
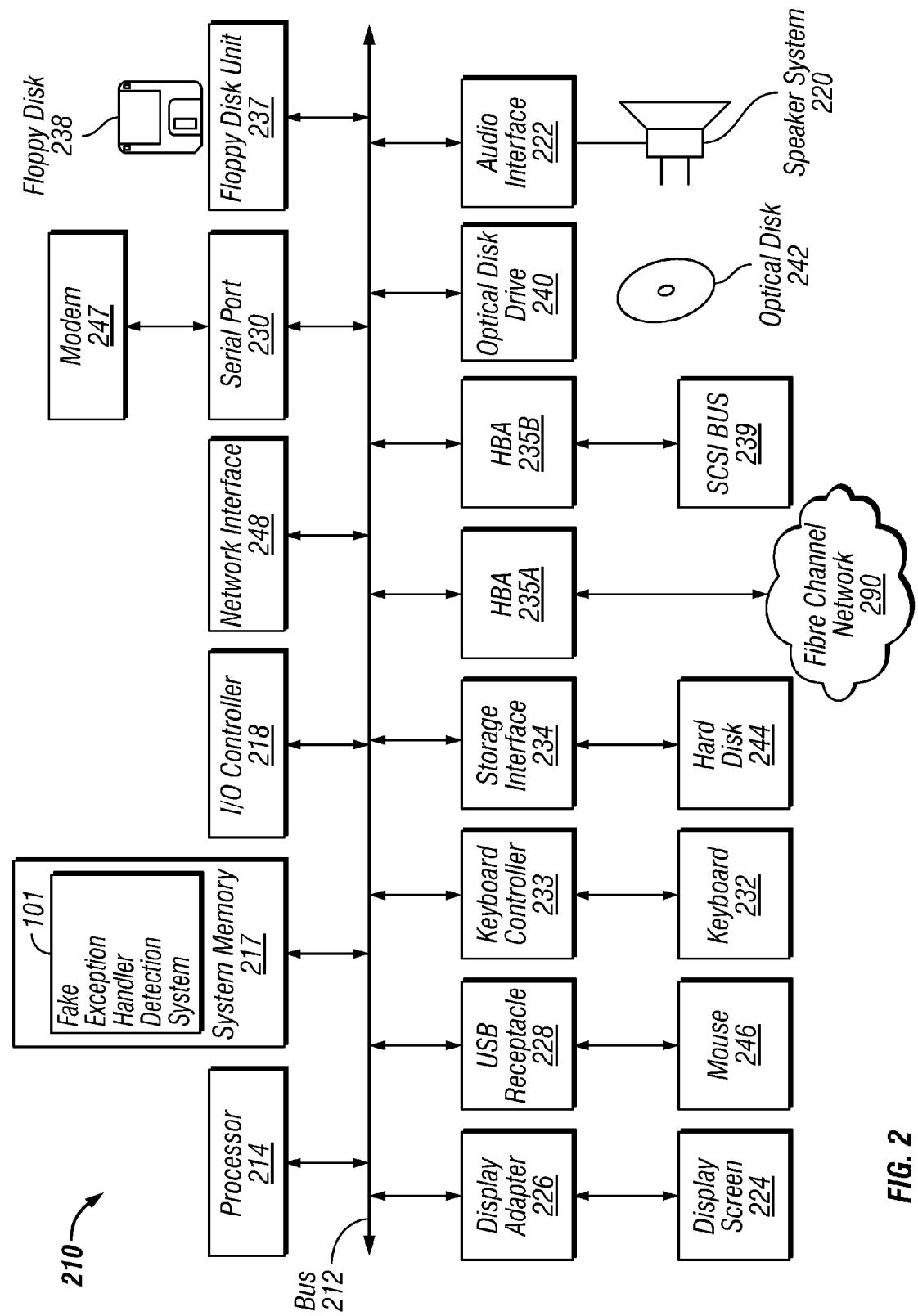
FIG. 2 is a block diagram of a computer system suitable for implementing a fake exception handler detection system, according to some embodiments.

FIG. 2 is a block diagram of a computer system 210 suitable for implementing a fake exception handler detection system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the fake exception handler detection system 101 is illustrated as residing in system memory 217. The workings of the fake exception handler detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
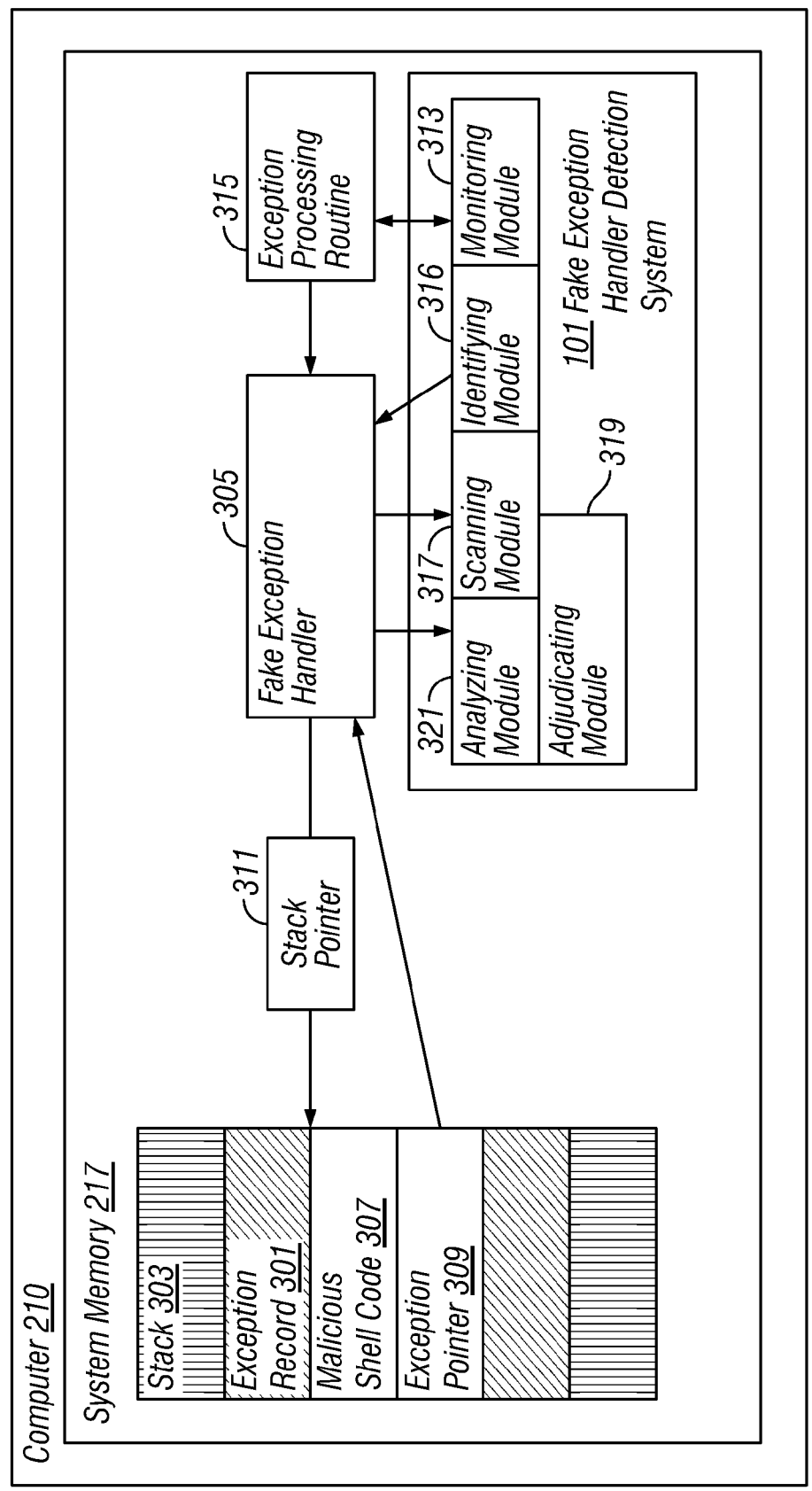
FIG. 3 is a block diagram of the operation of a fake exception handler detection system, according to some embodiments.

FIG. 3 illustrates the operation of a fake exception handler detection system 101 residing in the system memory 217 of computer 210, according to some embodiments. As described above, the functionalities of the fake exception handler detection system 101 can reside on a client 103, a server 105, or be distributed between multiple computer systems 210, including within a cloud-based computing environment in which the functionality of the fake exception handler detection system 101 is provided as a service over a network 107. It is to be understood that although the fake exception handler detection system 101 is illustrated in FIG. 3 as a single entity, the illustrated fake exception handler detection system 101 represents a collection of functionalities, which can be instantiated as a single or multiple modules as desired (an instantiation of specific, multiple modules of the fake exception handler detection system 101 is illustrated in FIG. 3). It is to be understood that the modules of the fake exception handler detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the fake exception handler detection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a fake exception handler detection system 101 detects attacks which overwrite an exception record 301 on the stack 303 in order to call a fake exception handler 305 and pass execution to malicious shellcode 307. As noted above, the attacker modifies the exception record 301 in such a way that the exception handler pointer 309 in the exception record 301 points to a fake exception handler 305. If the attacker is able to overwrite the exception handler pointer 309, the fake exception handler 305 executes when the operating system encounters an exception. The fake exception handler 305 comprises a special sequence of instructions that cause execution to be transferred to the attacker's malicious shellcode 307, the beginning of which the attacker wrote to the stack 303 as part of the buffer overflow.

To successfully transfer execution to the attacker's malicious shellcode 307, the fake exception handler 305 needs to modify the stack pointer 311 (ESP) so as to shrink the stack 303 by a set amount (the size of two pointers, 8 bytes for 32-bit processors, 16 bytes for 64-bit processors) and then execute a return (RET) instruction. Under Intel and many other makes of processors, the stack 303 "grows" downward, i.e., is made larger by decrementing the stack pointer 311. Thus, under such processors, the stack pointer 311 is incremented in order to shrink the stack 303. However, under a processor in which the stack grows upward, the opposite is the case (i.e., the stack pointer 311 is decremented in order to shrink the stack 303). Note that the stack pointer 311 can be incremented by 8 bytes in several different ways, such as but not limited to popping any 32-bit register off the stack 303 twice (POP reg32 POP reg32) or by adding 8 to the stack pointer 311, either directly (ADD ESP, 8) or via a register (MOV reg32, 8 ADD ESP, reg32). (To shrink the stack pointer 311, SUB instructions are substituted for the ADDs.)

When an exception occurs and the fake exception handler 305 is called, the malicious shellcode 307 which the attack wrote to the stack 303 is located at [ESP+8] (on a 32-bit Intel processor). If the attacker overwrites the exception handler pointer 309 with the address of instructions to modify the value of the stack pointer 311 so as to shrink the stack 303 by 8 (or 16) bytes and return (e.g., a POP/POP/RET sequence), when an exception occurs these instructions execute, and execution then transfers to the address on the stack 303 where the attacker has installed the beginning of the malicious shellcode 307. (By modifying the stack pointer 311 by the requisite number of bytes, the fake exception handler 305 adjusts the value of the stack pointer 311 such that the beginning of the malicious shellcode 307 is located at what is now the top of the stack 303). Note that because the attacker only has four bytes to work with at this location on the stack 303, the beginning of the malicious shellcode 307 is typically in the form of a jump to additional malicious code (not illustrated).

Thus, the fake exception handler 305 attempts to modify the value of the stack pointer 311 so as to shrink the stack 303 by the specific amount, and then return. Fake exception handlers 305 thus take one of several possible forms, such as 1) POP reg32 POP reg32 RET, 2) ADD ESP, 8 RET or 3) MOV reg32, 8 ADD ESP, reg32 RET. It is also possible that these instructions will be interleaved with some benign instructions (NOPs). Note that a fake exception handler 305 is actually in the form of a section of memory (e.g., within the loaded program being exploited or a loaded system resource) that happens to comprise the needed sequence of instructions, as opposed to being a component specifically written and installed by the attacker.

The fake exception handler detection system 101 leverages the above-described information concerning the logistics of attacks which overwrite an exception record 301 in order to detect fake exception handlers 305. More specifically, a monitoring module 313 of the fake exception handler detection system 101 monitors the operating system exception processing logic running on the computer 210. In one embodiment the monitoring module 313 intercepts calls to the operating system exception processing routines 315 (either kernel mode routines, such as nt!KiDispatchException and nt!RtlDispatchException, or user mode routines, such as nt!KiUserDispatchException). In such embodiments, after intercepting an exception processing routine 315, an identifying module 316 of the exception handler detection system 101 identifies the exception handler to be called by the intercepted exception processing routine 315. The fake exception handler detection system 101 performs the tests described below to determine whether the identified exception handler is fake, before allowing the exception handler to run. If the identified exception handler is adjudicated to be legitimate, the exception processing is allowed to proceed. On the other hand, if the exception handler is adjudicated to be fake, the fake exception handler detection system 101 does not transfer control to the exception handler. Further steps that can be taken in response to identifying a fake exception handler 305 are described below.

In another embodiment, the monitoring module 313 is instantiated by modifying the operating system code that performs the exception processing. As with the system call intercepting embodiment described above, when an exception occurs the identifying module 316 identifies the exception handler to be called, and the fake exception handler detection system 101 determines whether the identified exception handler is fake. Control is only transferred to the exception processing code where the identified exception handler is legitimate.

There are two tests that the fake exception handler detection system 101 can perform to determine whether an exception handler is fake. Both of these tests leverage the fact that the instructions comprising a legitimate exception handler are very different from those in a fake exception handler 305. There are two distinguishing factors. One is that legitimate exception handlers typically execute significantly more instructions before returning (i.e., before the RET instruction). This is because a legitimate exception handler typically carries out a number of validations and/or actions before it returns, whereas a fake exception handler simply modifies the value of the stack pointer 311 so as to shrink the stack 303 by a set amount (and possibly executes some no-ops) prior to returning. Secondly, the initiating code (function prologue) of a legitimate exception handler modifies the value of the stack pointer 311 so as to grow the stack 303 (or does not modify the value of the stack pointer 311), whereas a fake exception handler 305 shrinks the stack 303, as explained above. Note that a legitimate exception handler grows the stack 303 in order to create a stack frame for itself and reserve room for local storage. The beginning of a fake stack handler 305, on the other hand, shrinks the stack 303, which is not an action that a legitimate stacker handler would perform.

Thus, by testing to see whether the exception handler performs these actions, the fake exception handler detection system 101 can detect fake exception handlers 305. Therefore, when an exception handler is identified by the identifying module 316, a scanning module 317 of the fake exception handler detection system 101 can scan a specific number of first bytes of the exception handler, looking for a return instruction (op-code 0xc2 or 0xc3 for Intel's x86 processors). The specific number of bytes to scan is a variable design parameter, and different values can be used in different embodiments. The idea is to scan the first 3 to 10 or so instructions (e.g., 12-40 bytes) of the handler, looking for a RET instruction.

If a RET instruction is not found in the scanned portion of the handler, an adjudicating module 319 of the fake exception handler detection system 101 can adjudicate the exception handler as being legitimate. This is because if the exception handler executes more than a given number of instructions before returning, it is considered to be too complex to be used as a fake exception handler 305. However, if a RET instruction is found in the scanned area of the exception handler, the exception handler could be adjudicated to be fake, depending upon the results of the other test.

An analyzing module 321 of the fake exception handler detection system 101 analyzes the instructions of the exception handler that are positioned before the RET instruction, in order to determine how they affect the value of the stack pointer 311. If the instructions before the RET instruction modify the value of the stack pointer 311 so as to grow the stack 303, the exception handler can be adjudicated as being legitimate. This is the case because fake exception handlers 305 modify the value of the stack pointer 311 so as to shrink the stack 303 prior to returning, as described above. Although a legitimate exception handler would be expected to modify the value of the stack pointer 311 so as to grow the stack 303, in some embodiments if the instructions prior to the return do not affect the value of the stack pointer 311 one way or the other, the exception handler can still be adjudicated as being legitimate, because a fake exception handler is expected to modify the value of the stack pointer 311 so as to shrink the stack 303. Where the instructions prior to the RET instruction modify the value of the stack pointer 311 so as to shrink the stack 303, the exception handler can be adjudicated to be fake.

Note that although the two tests (scanning of the first n bytes of the exception handler looking for the return instruction, and determining whether the instructions prior to the return instruction modify the value of the stack pointer 311 so as to shrink the stack 303) can be performed in either order, it is more efficient to scan for the return instruction first. For example, in one embodiment, the scanning test is performed first, and if no return instruction is found in the scanned portion of the exception handler, the adjudicating module 319 adjudicates the exception handler as being legitimate without further testing. On the other hand, where a return instruction is found in the scanned portion of the exception handler, the analyzing test is performed. If the instructions prior to the return instruction modify the value of the stack pointer 311 so as to grow the stack 303, the adjudicating module 319 adjudicates the exception handler as being legitimate, whereas if these instructions modify the value of the stack pointer 311 so as to shrink the stack 303, the adjudicating module 319 adjudicates the exception handler as being fake. Note that in some embodiments, the exception handler must meet both tests to be adjudicated as fake, whereas in other embodiments, one test is sufficient.

Where an exception handler is adjudicated as being fake, the fake exception handler detection system 101 does not transfer execution to the fake exception handler 305. In addition, a number of other steps can be taken, such as adjudicating the associated program as being infected with malicious code, running an antimalware program (not illustrating), reporting the detection to a central security server (not illustrated), etc.

Figure 4:
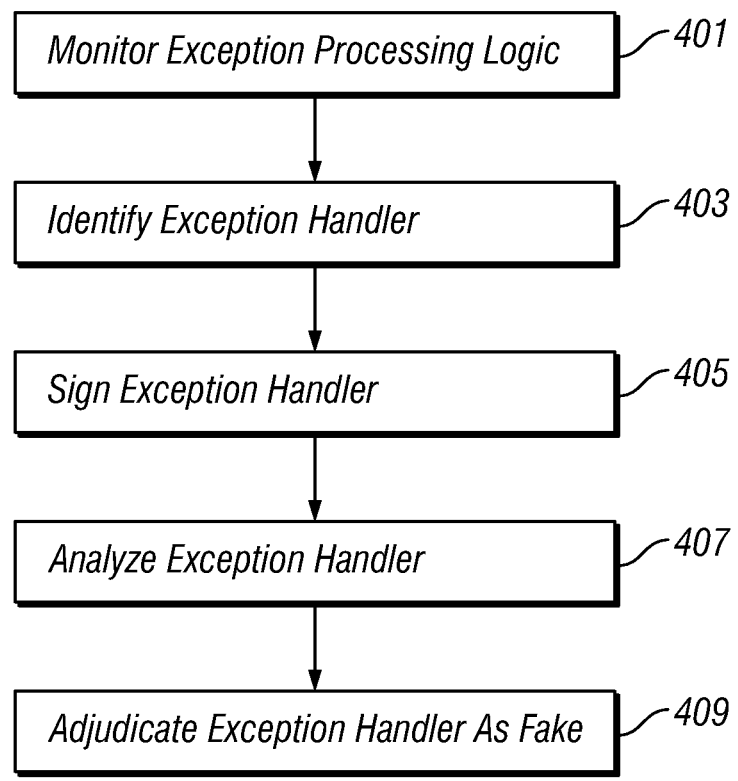
FIG. 4 is a flowchart of the operation of a fake exception handler detection system, according to some embodiments.

FIG. 4 illustrates steps of the operation of the fake exception handler detection system 101 (FIG. 1), according to some embodiments. The monitoring module 313 (FIG. 3) monitors 401 the operating system exception processing logic running on the computer 210 (FIG. 2). The identifying module 316 (FIG. 3) identifies 403 the exception handler to be called by the monitored exception processing logic. The scanning module 317 (FIG. 3) scans 405 a specific number of the first bytes of the identified exception handler, thereby determining whether a return instruction is present therein. The analyzing module 321 (FIG. 3) analyzes 407 the instructions of the identified exception handler that are positioned prior to the return instruction, thereby determining whether these instructions modify the value of the stack pointer 311 (FIG. 3) so as to shrink the stack 303 (FIG. 3). The adjudicating module 319 (FIG. 3) adjudicates 409 the identified exception handler as being fake, responsive to determining that a return instruction is present in the first specific number of bytes of the exception handler and/or that the instructions positioned prior to the return instruction modify the value of the stack pointer 311 (FIG. 3) so as to shrink the stack 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting a fake exception handler resulting from a malicious stack buffer overflow that overwrote an exception handling record on the stack, the method comprising the steps of:

monitoring operating system exception processing logic on a computer;

responsive to an exception occurring, identifying an exception handler to be called by the monitored operating system exception processing logic;

scanning a specific number of first bytes of the identified exception handler, thereby determining whether a return instruction is present in the first specific number of bytes of the identified exception handler, and responsive to determining whether a return instruction is present in the first specific number of bytes of the identified exception handler performing one from a group of further actions consisting of: 1) responsive to determining that a return instruction is not present in the first specific number of bytes of the identified exception handler, adjudicating the identified exception handler to be legitimate without further testing; and 2) responsive to determining that the return instruction is present in the first specific number of bytes of the identified exception handler, analyzing instructions of the identified exception handler that are positioned prior to the return instruction, thereby determining whether the analyzed instructions that are positioned prior to the return instruction modify a value of a stack pointer so as to shrink the stack, and adjudicating the identified exception handler to be legitimate or to be fake based on whether the analyzed instructions that are positioned prior to the return instruction modify the value of the stack pointer so as to shrink the stack.

2. The method of claim 1 wherein monitoring the operating system exception processing logic on the computer further comprises:
intercepting calls to operating system exception processing routines.

3. The method of claim 1 wherein monitoring the operating system exception processing logic on the computer further comprises:
executing monitoring functionality as part of modified operating system exception processing logic.

4. The method of claim 1 further comprising:
determining that the analyzed instructions that are positioned prior to the return instruction modify the value of the stack pointer so as to shrink the stack; and
adjudicating the identified exception handler to be fake, responsive to determining that the return instruction is present in the first specific number of bytes of the identified exception handler, and that the analyzed instructions that are positioned prior to the return instruction modify the value of the stack pointer so as to shrink the stack.

5. The method of claim 1 further comprising:
determining that the analyzed instructions that are positioned prior to the return instruction do not modify the value of the stack pointer so as to shrink the stack; and
adjudicating the identified exception handler to be legitimate, responsive to determining that the analyzed instructions that are positioned prior to the return instruction do not modify the value of the stack pointer so as to shrink the stack.

6. At least one non-transitory computer readable storage medium storing a computer program product for detecting a fake exception handler resulting from a malicious stack buffer overflow that overwrote an exception handling record on the stack, the computer program product comprising:
program code for monitoring operating system exception processing logic on a computer;
program code for, responsive to an exception occurring, identifying an exception handler to be called by the monitored operating system exception processing logic;
program code for scanning a specific number of first bytes of the identified exception handler, thereby determining whether a return instruction is present in the first specific number of bytes of the identified exception handler, and responsive to determining whether a return instruction is present in the first specific number of bytes of the identified exception handler performing one from a group of further actions consisting of: 1), responsive to determining that a return instruction is not present in the first specific number of bytes of the identified exception handler, adjudicating the identified exception handler to be legitimate without further testing; and 2) responsive to determining that the return instruction is present in the first specific number of bytes of the identified exception handler, analyzing instructions of the identified exception handler that are positioned prior to the return instruction, thereby determining whether the analyzed instructions that are positioned prior to the return instruction modify a value of a stack pointer so as to shrink the stack, and adjudicating the identified exception handler to be legitimate or to be fake based on whether the analyzed instructions that are positioned prior to the return instruction modify the value of the stack pointer so as to shrink the stack.

7. The computer program product of claim 6 further comprising:
program code for determining that the analyzed instructions that are positioned prior to the return instruction modify the value of the stack pointer so as to shrink the stack; and
program code for adjudicating the identified exception handler to be fake, responsive to determining that the return instruction is present in the first specific number of bytes of the identified exception handler, and that the analyzed instructions that are positioned prior to the return instruction modify the value of the stack pointer so as to shrink the stack.

8. The computer program product of claim 6 further comprising:
program code for determining that the analyzed instructions that are positioned prior to the return instruction do not modify the value of the stack pointer so as to shrink the stack; and
program code for adjudicating the identified exception handler to be legitimate, responsive to determining that the analyzed instructions that are positioned prior to the return instruction do not modify the value of the stack pointer so as to shrink the stack.

9. The computer program product of claim 6 wherein the program code for monitoring the operating system exception processing logic on the computer further comprises:
program code for intercepting calls to operating system exception processing routines.

10. The computer program product of claim 6 wherein the program code for monitoring the operating system exception processing logic on the computer further comprises:
executing monitoring functionality as part of modified operating system exception processing logic.

11. A computer implemented method for detecting a fake exception handler resulting from a malicious stack buffer overflow that overwrote an exception handling record on the stack, the method comprising the steps of:
monitoring operating system exception processing logic on a computer;
responsive to an exception occurring, identifying an exception handler to be called by the monitored operating system exception processing logic;
analyzing instructions of the identified exception handler that are positioned within a specific number of first bytes of the identified exception handler, thereby determining whether the analyzed instructions that are positioned within the specific number of first bytes of the identified exception handler modify a value of a stack pointer so as to shrink the stack, and responsive to determining whether the analyzed instructions that are positioned within the specific number of first bytes of the identified exception handler modify a value of the stack pointer so as to shrink the stack, performing one from a group of further actions consisting of: 1) responsive to determining that the analyzed instructions that are positioned within the specific number of first bytes do not modify the value of the stack pointer so as to shrink the stack, adjudicating the identified exception handler to be legitimate without further testing; and 2) responsive to determining that the analyzed instructions that are positioned within the specific number of first bytes do modify the value of the stack pointer so as to shrink the stack, scanning the specific number of first bytes of the identified exception handler, thereby determining whether a return instruction is present in the first specific number of bytes of the identified exception handler, and adjudicating the identified exception handler to be legitimate or to be fake based on whether a return instruction is present in the first specific number of bytes of the identified exception handler.

12. The method of claim 11 further comprising:
determining that the return instruction is present in the first specific number of bytes of the identified exception handler; and
adjudicating the identified exception handler to be fake, responsive to determining that the analyzed instructions that are positioned in the first specific number of bytes of the identified exception handler modify the value of the stack pointer so as to shrink the stack, and that the return instruction is present in the first specific number of bytes of the identified exception handler.

13. The method of claim 11 further comprising:
determining that the return instruction is not present in the first specific number of bytes of the identified exception handler; and
adjudicating the identified exception handler to be legitimate, responsive to determining that the return instruction is not present in the first specific number of bytes of the identified exception handler.

14. The method of claim 11 wherein monitoring the operating system exception processing logic on the computer further comprises:
intercepting calls to operating system exception processing routines.

15. The method of claim 11 wherein monitoring the operating system exception processing logic on the computer further comprises:
executing monitoring functionality as part of modified operating system exception processing logic.

* * * * *